Nov. 1, 1932.  J. C. SCHELLENG  1,885,632
OSCILLATION GENERATOR
Filed Oct. 13, 1924
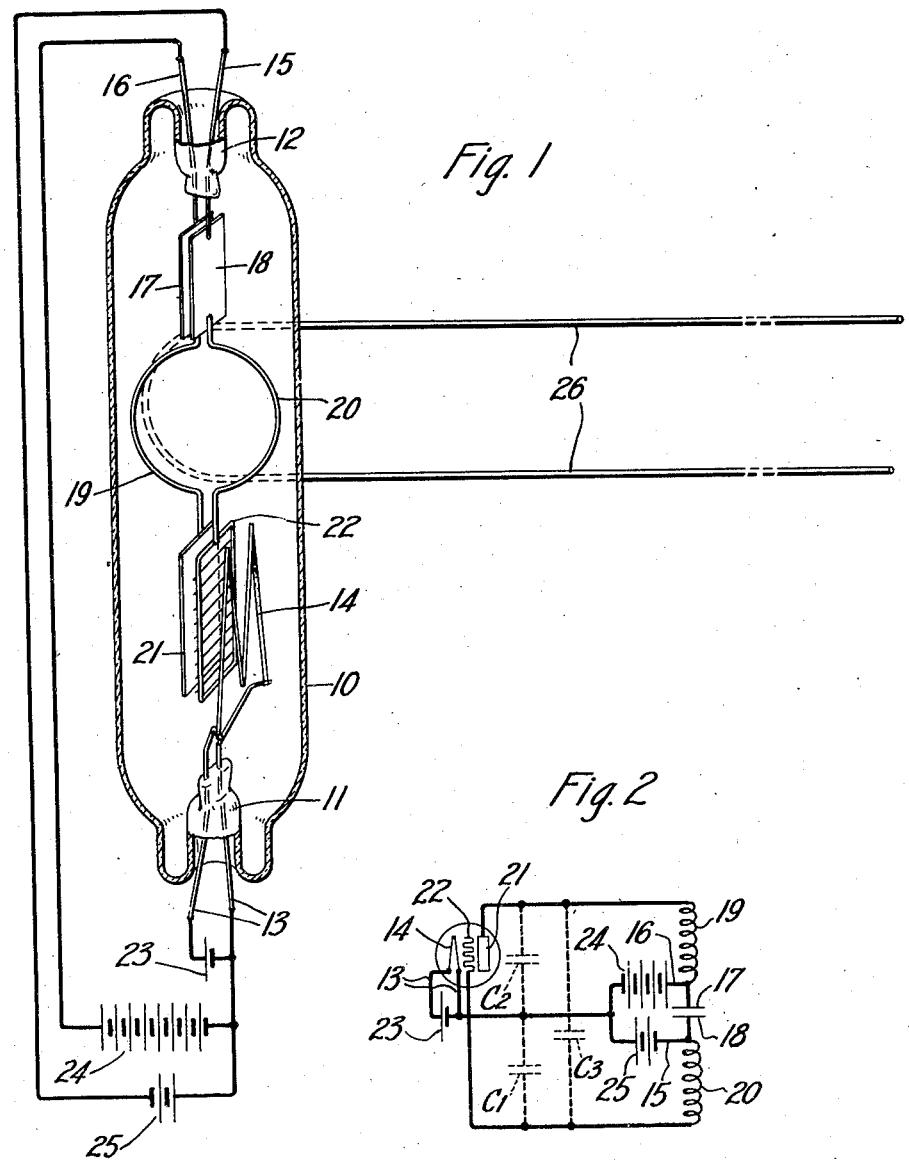
Inventor:
John C. Schelleng
by ̶E̶.̶W̶.̶ ̶A̶d̶a̶m̶s̶ Atty.

Patented Nov. 1, 1932

1,885,632

UNITED STATES PATENT OFFICE

JOHN C. SCHELLENG, OF MILLBURN, NEW JERSEY, ASSIGNOR TO WESTERN ELECTRIC COMPANY, INCORPORATED, OF NEW YORK, N. Y., A CORPORATION OF NEW YORK

OSCILLATION GENERATOR

Application filed October 13, 1924. Serial No. 743,321.

This invention relates to oscillation generators and has for its object an electron discharge device capable of generating electrical oscillations of short wave length.

This object is attained by providing looped leading-in wires for the grid electrode and anode and utilizing the capacities between the electrodes and the inductances of the leading-in wires to form an oscillating circuit. Thus all elements of the oscillation generator are contained within an evacuated vessel and it is necessary only to supply direct current to the electrodes thereby obviating dielectric power losses in the glass.

Referring now to the drawing, Fig. 1 discloses a device embodying the invention and Fig. 2 discloses the circuit of the generator.

An enclosing vessel 10 of glass, or other material is provided with a reentrant stem 11 at one end and a reentrant stem 12 at the other end. Leading-in wires 13 are sealed in the stem 11 and support the cathode 14. In the stem 12 are sealed leading-in wires 15 and 16 which support respectively the parallel plates 17 and 18. Supported by the plates 17 and 18 are opposed wires 19 and 20 bent to form semi-circles and which in turn support respectively the anode 21 and grid 22. A battery 23 provides heating current for the cathode 14, and a battery 24 supplies space current between the cathode 14 and anode 21, battery 25 being provided to maintain the grid 22 negative with respect to the cathode 14.

In this device the inductance of the loops 19 and 20 and the capacities between the various electrodes are utilized to constitute an oscillating circuit and the condenser formed by the plates 17 and 18 serves to provide an alternating current connection between the inductances 19 and 20. The oscillation circuit is contained wholly within the enclosing vessel of the device, and it is necessary only to carry direct current through the various leading-in wires.

Fig. 2 discloses the circuit schematically. It will be noted that the capacity $C_1$ between the filament and grid and the capacity $C_2$ between the filament and anode are in parallel relation to the capacity $C_3$ between the grid and plate and combine therewith to produce the effective capacity of the circuit. Around these capacities are shunted the inductances 19 and 20 connected in series by the condenser 17 and 18. This circuit is of a well known type and its operation is well understood.

The grid and plate capacity and the inductances of the wires 19 and 20 are determinative of the wave length of the oscillations produced, the plate and filament and grid and filament capacities being so small that their effect on the determination of the wave length is inconsiderable. The grid plate capacity is of the order of two micro-micro-farads and the inductance of the loop is of the order of one tenth of one microhenry. The length of the wave generated by this oscillator will be of the order of 100 centimeters. The plates 17 and 18 are of such area and so close together that the capacity thereof does not enter into the determination of the frequency of the oscillations generated, and the potential difference therebetween is kept sufficiently low to avoid appreciable dielectric losses.

A Lecher loop 26 is arranged in inductive relation to the loops 19 and 20 to provide means for radiating the oscillations generated by the device.

It is, of course, understood that various modifications may be made in the structure of the device without in any way departing from the spirit of the invention as set forth in the appended claims.

What is claimed is:

1. In combination, an evacuated vessel, a cathode, a plate electrode and a grid electrode each supported therein, leading-in wires for said last two electrodes, and conductors connecting said leading-in wires to said plate and grid electrodes respectively, said conductors having opposed bowed portions.

2. In combination, an evacuated vessel, a cathode, grid and anode therein, leading-in wires for said grid and anode, conductors connecting said leading-in wires with said grid and anode respectively and having opposed bowed portions, an oscillation circuit within said vessel being constituted by said conductors and by the capacity between said grid and anode, said conductors being capacitively connected.

3. An oscillation generator comprising an evacuated vessel, a cathode, grid and anode within said vessel, and a reactive circuit within said vessel comprising inductive and capacitive elements, said reactive circuit and the electrostatic capacity between said grid and anode constituting the frequency determining circuit of the generator.

4. An oscillation generator comprising an evacuated vessel, a cathode, grid and anode therein, and a reactive element comprising conductors connected to said grid and anode, said reactive element and the electrostatic capacity between said grid and anode constituting the frequency determining circuit of the generator.

5. In combination, a space discharge oscillation generator comprising an evacuated vessel enclosing a cathode, a grid, an anode, a frequency determining circuit wholly within said vessel and including the conductors through which direct current energy is to be supplied to said grid and anode, and means wholly external to said vessel for deriving oscillations from said generator.

6. In combination, an evacuated vessel, enclosing a cathode, a grid, an anode, and a frequency determining circuit wholly within said vessel and comprised solely by the direct current leads for said grid and anode and the capacities between said grid and anode, and an element inductively coupled to said frequency determining circuit.

7. An oscillation generator comprising an electron discharge device consisting of an evacuated vessel enclosing a plurality of electrodes, leading-in wires for said electrodes, conductors connecting said leading-in wires with said electrodes and also constituting inductive elements, and capacitive means coupling said conductors at their ends remote from said electrodes for alternating current, whereby there is provided wholly within said vessel a conductive path for the oscillations generated, said path constituting the frequency determining circuit of the generator.

8. An oscillation generator comprising an evacuated vessel, enclosing a plurality of electrodes, leading-in wires for said electrodes, conductors connecting said leading-in wires with said electrodes, said conductors and the inherent capacity between said electrodes constituting the frequency determining circuit for said generator, and seals in said vessel for said leading-in wires, said circuit being completely enclosed in said vessel so as to prevent the application of the generated oscillations to said seals.

9. In combination, an evacuated vessel, electrodes therein including a cathode, a grid and an anode, leading-in wires for said grid and anode, conductors connecting said leading-in wires with said grid and anode, and a frequency determining circuit comprised solely by the capacity between said electrodes and the inductance and capacity of and between said conductors.

10. An oscillation generator comprising, an electron discharge device consisting of an evacuated vessel enclosing a plurality of electrodes, leading-in wires for a certain two of said electrodes, conductors connecting said leading-in wires with said electrodes, said conductors being inductive elements and each including a condenser electrode which condenser electrodes together constitute a capacity for coupling said inductive elements at their ends remote from said electrodes, said inductive elements and condenser with the inherent interelectrode capacities constituting the frequency determining circuit of the generator.

In witness whereof, I hereunto subscribe my name this 10th day of October A. D., 1924.

JOHN C. SCHELLENG.